(12) United States Patent
Tune et al.

(10) Patent No.: US 7,809,972 B2
(45) Date of Patent: Oct. 5, 2010

(54) DATA PROCESSING APPARATUS AND METHOD FOR TRANSLATING A SIGNAL BETWEEN A FIRST CLOCK DOMAIN AND A SECOND CLOCK DOMAIN

(75) Inventors: Andrew David Tune, Dronfield (GB); Pierre Michel Broyer, Vence (FR)

(73) Assignee: ARM Limited, Cambridge (GB)

( * ) Notice: Subject to any disclaimer, the term of this patent is extended or adjusted under 35 U.S.C. 154(b) by 657 days.

(21) Appl. No.: 11/729,984

(22) Filed: Mar. 30, 2007

(65) Prior Publication Data
US 2008/0244299 A1  Oct. 2, 2008

(51) Int. Cl.
*G06F 1/12* (2006.01)
*G01R 27/28* (2006.01)

(52) U.S. Cl. .................... 713/401; 713/400; 702/120
(58) Field of Classification Search ........... 713/401, 713/400
See application file for complete search history.

(56) References Cited
U.S. PATENT DOCUMENTS

| | | | |
|---|---|---|---|
| 5,809,336 A | 9/1998 | Moore et al. | |
| 6,247,082 B1 * | 6/2001 | Lo et al. | 710/105 |
| 6,549,593 B1 * | 4/2003 | Rumreich et al. | 375/354 |
| 6,910,145 B2 * | 6/2005 | MacLellan et al. | 713/400 |
| 6,954,869 B2 * | 10/2005 | Syed | 713/400 |
| 7,003,423 B1 * | 2/2006 | Kabani et al. | 702/120 |
| 7,016,245 B2 * | 3/2006 | Balasubramanian et al. | 365/207 |
| 2003/0007394 A1 * | 1/2003 | Phi et al. | 365/200 |

* cited by examiner

*Primary Examiner*—Suresh K Suryawanshi
(74) *Attorney, Agent, or Firm*—Nixon & Vanderhye P.C.

(57) ABSTRACT

A data processing apparatus includes a first component for generating a signal operating in the first clock domain having a first clock period, and a second component for receiving the signal operating in the second clock domain having a second clock period. The second clock period is synchronous with but slower than the first clock period. Interface circuitry is provided for translating the signal between the first clock domain and the second clock domain, the interface circuitry operating in the first clock domain and comprising a storage element for temporarily buffering the signal generated by the first component before outputting that signal to the second component. Enable circuitry is used to control output of the signal from the storage element having regard to a specified input delay value identifying an input delay time of the second component expressed in terms of the first clock period.

21 Claims, 12 Drawing Sheets

DATA PROCESSING APPARATUS AND METHOD FOR TRANSLATING A SIGNAL BETWEEN A FIRST CLOCK DOMAIN AND A SECOND CLOCK DOMAIN

BACKGROUND OF THE INVENTION

1. Field of the Invention

The present invention relates to a data processing apparatus and method for translating a signal between a first clock domain and second clock domain.

2. Description of the Prior Art

Within a data processing apparatus, it is common for certain components to be clocked at different clock frequencies to other components. For example, considering a system-on-chip (SoC), a component such as a central processing unit (CPU), which requires high performance, may be clocked at a higher frequency than certain other components of the system, for example a bus infrastructure, a memory system, a peripheral, etc, which either do not require such high performance, or are incapable of operating at the higher clock frequency.

As a result, a number of different clock domains may existing within the data processing apparatus, each clock domain having an associated clock period. Typically the various different clock periods are generated from a single clock generator that uses divider circuitry or the like to generate a number of different clock periods that are synchronously related to each other. For the purpose of the present application, when describing two different clock periods as being synchronous with each other, this means that at periodic intervals the sampling edge (typically the rising clock edge) of both clock periods are coincident (within the tolerances of the system).

In such systems, a mechanism needs to be provided for translating signals between different clock domains, such that a signal issued by one component operating in one clock domain can be received by another component operating in a different clock domain. In systems where two different clock domains have clock periods that are synchronous with each other, a clock enable signal is often generated in the faster of the two clock domains to provide a timing indication about the sampling edge in the slower clock domain, so that in the faster clock domain it can be determined when an occurrence of the sampling edge of the faster clock is coincident with the sampling edge of the slower clock. If a register is provided in the faster of the two clock domains to register a signal issued from the slower clock domain, then the above-mentioned clock enable signal can be used as an enable signal to that register to ensure that the signal issued from the slower clock domain to the faster clock domain is sampled only on the sampling edge of the faster clock period that is coincident with the sampling edge of the slower clock period. As a result, the output delay associated with the signal originating in the slower clock domain can be constrained against the slower clock period. During this output delay time, the output from the component in the slower clock domain cannot be guaranteed to be stable, and accordingly should not be sampled in the fast clock domain. By use of the clock enable signal, it is ensured that the signal is in fact not sampled at a time when the output is still unstable, since the earliest it is sampled in the fast clock domain is one slow clock period after it is issued by the component in the slow clock domain.

Similarly, a signal originating in the faster clock domain that must be translated to the slower clock domain can be arranged so that its value is only permitted to change on the sampling edge of the fast clock period that is coincident with the sampling edge of the slow clock period. Again, such a property can be ensured by using a clock enable signal as discussed above. By such an approach, it can be ensured that the input delays of the signal translated to the slower clock domain can be constrained against the slow clock period. Such input delays result from propagation delays over the path in the slow clock domain, combinatorial delays associated with combinatorial logic in the path, and setup delays associated with the component in the slow clock domain that is to receive the signal.

Whilst the above described mechanism is an effective mechanism for translating signals between two different clock domains, the mechanism adds significant latency to the transfer of the signal, because a transition of the signal in the fast clock domain that occurs following a sampling edge of the fast clock must be delayed until the next sampling edge of the slow clock, as illustrated schematically in FIG. 1.

In particular, FIG. 1 shows the transfer of a valid signal from a fast clock domain to a slow clock domain. The valid signal is asserted at the point indicated by the numeral 5 in FIG. 1, and if it were to be sampled by another component in the fast clock domain, it would be sampled at time 7 shown in FIG. 1 (i.e. at the next rising edge of the fast clock). However, the transition at point 5 is only allowed to be output into the slow clock domain as the asserted valid slow signal at point 30, namely at the time where the rising edge of the fast clock is coincident with the rising edge of the slow clock. As described earlier, this is indicated by the set clock enable signal 10, and the presence of the set clock enable signal 10 whilst the valid fast signal 20 is asserted causes the valid slow signal to be asserted at point 30. However, it is only on the next rising edge of the slow clock, i.e. at point 45 in FIG. 1, that the asserted valid slow signal can be sampled in the slow clock domain. Further, when the clock enable signal is again asserted at point 40 in the presence of an asserted valid slow signal, this causes both the valid fast and the valid slow signals to be de-asserted shortly after point 45 as indicated by transitions 47, 50, respectively, given that the valid slow signal was sampled at point 45. The timing between points 7 and 45 in FIG. 1 represents the worst case for the additional latency introduced as a result of the fast to slow clock domain transition, since the valid signal was asserted at a time when the fast and slow clocks were coincident.

In the right-hand side of FIG. 1, the best case for the additional latency added as a result of the fast to slow clock domain transition is indicated. Here, the valid fast signal is asserted one fast clock period before a time at which the fast and slow clock periods are coincident. Accordingly, at time 75, the presence of the asserted clock enable signal 60 and the asserted valid fast signal 70 causes the valid slow signal to be asserted at point 80. Then, one slow clock period later, at point 97, the valid slow signal is sampled in the slow clock domain and the presence of the next asserted clock enable signal 90 in the presence of an asserted valid slow signal causes the valid fast and valid slow signals to be de-asserted at points 93, 95, respectively.

As is apparent from FIG. 1, even in the best case, the additional latency added as a result of the fast to slow clock domain transition equates to one full slow clock period.

FIG. 2 shows an alternative scheme that has been developed with the aim of seeking to reduce the latency when translating signals between two different clock domains. In accordance with this scheme, a signal originating in the faster clock domain that must be translated to the slower clock domain is allowed to change on any sampling edge of the fast clock, regardless of whether that sampling edge is coincident with a sampling edge of the slow clock. Hence, as shown in FIG. 2, if at point 105, the valid fast signal is asserted as indicated by the line 120, then the rising edge 110 of the fast clock will cause the valid slow signal to be asserted at point 130, this occurring one fast clock period before the next sampling edge of the slow clock period. Accordingly, the valid slow signal will be sampled in the slow domain at point 145. Further, the presence of the asserted clock enable 140 in the presence of an asserted valid slow signal will cause the valid fast and valid slow signals to be de-asserted at points 147, 150, respectively. As a result, it can be seen that for this best case, the additional latency resulting from the fast to slow transition is merely a single fast clock cycle.

Considering the worst case as shown in the right-hand side of FIG. 2, if the valid fast signal 170 is asserted one fast clock period before the point where the sampling edges of the fast and slow clocks are coincident, then on the next sampling edge 160 of the fast clock, the valid slow signal 180 can be asserted, as indicated by the point 155 in FIG. 2. However, it is not until the next rising edge of the slow clock at point 185 that the valid slow signal will actually be sampled in the slow clock domain and the presence of the next asserted clock enable signal 190 in the presence of an asserted valid slow signal will cause both the valid fast and valid slow signals to be de-asserted at points 193, 195, respectively. Hence, in this worst case scenario, the additional latency equates to one slow clock period. A similar mechanism can also be adopted for signals being sent from the slow clock domain to the fast clock domain, to again reduce the latency associated with the transition.

Whilst such a mechanism undoubtedly reduces the latency associated with the transition between the clock domains, a problem with such an approach is that the input delays of the signal translated to the slower clock domain (or the output delays of a signal translated to the fast clock domain) must be constrained against the fast clock period since in the case of the smallest latency there is only one fast clock period between the signal being asserted and the signal being sampled. This imposes a significant number of constraints in the design of the components in the slow clock domain, and in many situations it is difficult to meet the required timing in the slow clock domain. Indeed, such an approach is feasible only in a limited set of cases, for example where the inputs/outputs in the slow clock domain component are registered and are physically close to the fast clock domain outputs/inputs.

In practice, timing closure may not be achievable when using such a scheme, and it then becomes necessary to add additional registering and associated logic in the slow clock domain to seek to address this problem. Such additional registering and logic increases area, power consumption, and design iteration, and further can cause latency to be increased to such a level that it can negate the potential latency reductions associated with the technique of FIG. 2.

Accordingly, it would be desirable to provide an improved technique for translating a signal between two clock domains which enables a reduction in the latency when compared with the standard prior art approach of FIG. 1, and which does not suffer from the problems associated with the technique as illustrated in FIG. 2.

U.S. Pat. No. 5,809,336 describes a microprocessor system having a CPU clocked by a ring oscillator variable speed clock. An input/output interface is independently clocked by a second clock connected thereto.

SUMMARY OF THE INVENTION

Viewed from a first aspect, the present invention provides a data processing apparatus comprising: a first component for generating a signal, the first component operating in a first clock domain having a first clock period; a second component for receiving the signal, the second component operating in a second clock domain having a second clock period, the second clock period being synchronous with but slower than the first clock period; interface circuitry for translating the signal between the first clock domain and the second clock domain, the interface circuitry operating in the first clock domain and comprising a storage element for temporarily buffering the signal generated by the first component before outputting that signal to the second component; and enable circuitry for controlling output of the signal from the storage element having regard to a specified input delay value identifying an input delay time of the second component expressed in terms of the first clock period.

In accordance with the first aspect of the present invention, interface circuitry is provided that comprises a storage element for temporarily buffering a signal generated by a first component before outputting that signal to a second component operating in a slower clock domain. Enable circuitry is then used to control output of the signal from the storage element having regard to a specify input delay value identifying an input delay time of the second component expressed in terms of the first clock period, i.e. the faster clock period. Hence, through use of the present invention, the input delay time of the second component in the slower clock domain can be configured in terms of the fast clock period, thereby enabling the latency to be tuned having regard to the slow clock domain input delay constraints. Where the required input delay time of the second component is less than one full slow clock period (i.e. one full second clock period considering this first aspect of the present invention), there is a reduction in latency for the signal translated from the first clock domain to the second clock domain when compared with the prior art technique of FIG. 1, which gives rise to a corresponding increase in bandwidth. Further, unlike the technique of FIG. 2, the input delay of the second component is not constrained against the first, fast clock period, and accordingly the technique of the present invention does not suffer from the problems associated with the mechanism described earlier with reference to FIG. 2.

The enable circuitry can be configured in a variety of ways. However, in one embodiment, the enable circuitry is arranged to issue an enable signal to the storage element, the enable signal being set to identify a window of time during which the storage element is enabled to output the signal to the second component, the enable circuitry being responsive to the specified input delay value and a clock ratio value specifying a ratio between the first clock period and the second clock period to determine when to set said enable signal. In particular, this window of time equates to a period during which the output from the storage element is allowed to change, and is followed by the input delay time occurring prior to the sampling edge of the second clock period during which time the output from the storage element is not allowed to change. By knowing the clock ratio value and the specified input delay value, the above-mentioned window of time during which the output is allowed to change can be determined. As an example, if the clock ratio is 3:1 (i.e. the fast clock is operating at three times the frequency of the slow clock) and the specified input delay value identifies the input delay time as two fast clock periods, then the available window of time during which the output is allowed to change will be one fast clock period.

There are a number of ways in which the enable signal can be set to identify the window of time during which the storage element is enabled to output the signal to the second component. In one embodiment the enable signal is actually set for one first clock period longer than the number of first clock periods associated with that window of time, given that the storage element will only begin sampling its input, and accordingly potentially changing its output, on the sampling edge of the first clock following the sampling edge on which the enable signal is set. The last clock period in which the enable signal will be set will be the last first clock period prior to the start of the input delay time of the second component and hence irrespective of when the enable signal is actually set, this last clock period in which it is retained in the set condition affectively identifies the end of the window of time during which the storage element is enabled to output the signal to the second component. In an alternative embodiment, the enable signal can be arranged so that it is only set for this last first clock period prior to the start of the input delay time, again this set enable signal effectively identifying the window of time by identifying the last first clock period during which the storage element can change its output.

In one embodiment, said enable circuitry comprises counter circuitry which is responsive to each iteration of the first clock period to modify a count value, the count value being initialised to an initial value selected in dependence on at least the clock ratio value, and the enable signal being set until the count value reaches a predetermined value.

In some embodiments, both the clock ratio value and the specified input delay value can be used to derive the initial value, and in some particular implementations this can enable the counter circuitry to be simplified. In particular, such implementations may enable the size of the counter circuitry to be reduced. Indeed, in some embodiments, where the specified input delay value is one fast clock cycle less than the clock ratio value, it may be possible to replace the counter circuitry with a simple register. In one particular embodiment, such a register could be clocked by the fast clock, with its D-input connected to an indication signal providing a timing indication of a sampling edge in the second clock domain (also referred to herein as a CLKEN signal) and its Q output producing the enable signal.

In one embodiment, the initial value of the count value is derived from the clock ratio value, and the count value is decremented on each iteration of the first clock period, the enable circuitry further comprising: comparator circuitry for comparing the count value with the specified input delay value and for setting said enable signal until the count value reaches said predetermined value, said predetermined value being derived from the specified input delay value. In one embodiment, the predetermined value is chosen such that the count value reaches the predetermined value in the last first clock period before the start of the input delay time, so that the enable signal is de-asserted at the end of that first clock period.

In an alternative embodiment, the comparator circuitry is arranged so that it only sets the enable signal when the count value reaches said predetermined value so that the enable signal is only set for that final first clock period prior to the start of the input delay time.

In one embodiment, the counter circuitry is arranged to receive an indication signal providing a timing indication of a sampling edge in the second clock domain, the count value being re-initialised to said initial value in dependence on the indication signal. In one particular embodiment, the indication signal takes the form of a clock enable signal which is set during the first clock period immediately preceding the sampling edge in the second clock domain.

In one embodiment, the clock ratio value may be predetermined, and provided as an input to the enable circuitry. However, in an alternative embodiment the enable circuitry is arranged to determine the clock ratio value by counting the number of first clock periods between consecutive timing indications provided by said indication signal.

The specified input delay value may in one embodiment be fixed, and accordingly hard-wired as an input to the enable circuitry. However, in an alternative embodiment, the specified input delay value may be programmable. Hence, if the frequency of either the first clock domain or the second clock domain were to be changed, then the specified input delay value could be reprogrammed as appropriate. Another benefit of making the specified input delay value programmable is in situations where the precise input delay is not known until late in the design process of the data processing apparatus. Allowing the interface circuitry to be tuned to the actual implementation through programming of the input delay value allows best possible performance without reiterating the design process, and aids early time to market.

In one embodiment, the data processing apparatus further comprises error determination circuitry for detecting a mis-sampling of the signal by the second component and generating an error signal upon such detection, the specified input delay value being chosen in dependence on said error signal. If it is possible to detect when a signal has been mis-sampled by the second component, then this information can be used to vary the specified input delay value, in particular to increase that specified input delay value in order to identify an increased input delay time to be associated with the second component.

The error determination circuitry can be formed in a variety of ways. For example, commonly-assigned US Patent Publication No. US 2004-0199821, the entire contents of which are hereby incorporated by reference, describes an integrated circuit in which a sampling circuit is arranged to sample a digital signal value at a first time and at a second later time, with any difference in the digital signal value samples being indicative of an error in operation of the integrated circuit. Error repair logic is then used to repair the error in operation. This technique recognises that the operation of the processing stages themselves can be directly monitored to find the limiting conditions in which they fail. When actual failures occur, then these errors can be corrected such that incorrect operation overall is not produced. It has been found that the performance advantages achieved by the avoidance of excessively cautious performance margins that may be used in more conventional approaches compared with the direct observation of the failure point when using the technique of the above U.S. patent application more than compensates for the additional time and power consumed in recovering the system when a failure does occur. Assuming the second component was constructed in a similar manner to the above-mentioned sampling circuit then a mis-sampling of the signal by the second component could be detected and an error signal generated which could then be used to vary the specified input delay value.

In one embodiment, the specified input delay value is an integer number of first clock periods. However, in principle, there is no requirement for the specified input delay value to be specified as an integer number, and accordingly non-integer values could also be specified.

The enable circuitry can be provided in a variety of ways. For example, in some embodiments the same enable circuitry could be used to produce enable signals for multiple separate interface circuits. However, in one embodiment, the enable circuitry is provided within the interface circuitry.

In accordance with the above described aspect of the present invention, the mechanism of the invention is used to handle the translation of a signal being passed from a first, faster, clock domain to a second, slower, clock domain. However, in accordance with another aspect of the present invention, the mechanism can be used to handle the translation of a signal passed from a first, slower, clock domain to a second, faster, clock domain.

In particular, viewed from a second aspect, the present invention provides a data processing apparatus comprising: a first component for generating a signal, the first component operating in a first clock domain having a first clock period; a second component for receiving the signal, the second component operating in a second clock domain having a second clock period, the second clock period being synchronous with but faster than the first clock period; interface circuitry for translating the signal between the first clock domain and the second clock domain, the interface circuitry operating in the second clock domain and comprising a storage element for temporarily buffering the signal generated by the first component before outputting that signal to the second component; and enable circuitry for controlling input of the signal into the storage element having regard to a specified output delay value identifying an output delay time associated with the output of the signal from the first component expressed in terms of the second clock period.

In accordance with this aspect of the present invention, the enable circuitry controls input of the signal into the storage element having regard to a specified output delay value identifying an output delay time associated with the output of the signal from the component in the slower clock domain. During this output delay time, the output from the component in the slower clock domain cannot be guaranteed to be stable, and accordingly should not be sampled in the fast clock domain. Through use of the present invention, this output delay time of the first component in the slower domain can be configured in terms of the faster clock period, thereby enabling the latency to be tuned having regard to the slow clock domain output delay constraints. Where the required output delay time of the first component is less than one full slow clock period (i.e. one full first clock period considering this second aspect of the present invention), there is a reduction in latency for the signal translated from the first clock domain to the second clock domain when compared with the known prior art techniques, without constraining the output delay of the first component against the second, fast clock period.

In one embodiment, the enable circuitry is arranged to issue an enable signal to the storage element, the enable signal being set to identify a window of time during which the storage element is enabled to receive the signal from the first component, the enable circuitry being responsive to the specified output delay value to determine when to set said enable signal. In one particular embodiment, the enable signal is only set once the output delay time associated with the output of the signal from the first component has expired, hence identifying the start of the window of time during which the storage element is enabled to receive the signal from the first component. Whilst in some embodiments, the enable signal may remain set for the entirety of the window of time available for receiving the signal from the first component, in other embodiments the enable signal may be set for less than the full window of time, and indeed in one embodiment it may be set for only a single fast clock period at the start of that window of time such that on the next sampling edge of the fast clock period, the signal will be sampled by the second component.

In one embodiment, the enable circuitry comprises counter circuitry which is responsive to each iteration of the second clock period to modify a count value, the count value being initialised to an initial value, and the enable signal being set when the count value reaches a predetermined value. In one particular embodiment, the initial value of the count value is zero, and the count value is incremented on each iteration of the second clock period, the enable circuitry further comprising: comparator circuitry for comparing the count value with the specified output delay value and for setting said enable signal when the count value reaches said predetermined value, said predetermined value being derived from the specified output delay value. In one particular embodiment, the predetermined value identifies the specified output delay value, and the enable signal is set in the second clock period following the period in which the count value matches that predetermined value. Dependent on the predetermined value, it may be possible for the construction of the counter circuitry to be simplified, and indeed in some embodiments the counter may only need to be a 1-bit counter, in which case the counter circuitry could be provided by a register. In one such embodiment, the register's output could be inverted and fed back to the input, whilst alternatively the CLKEN signal could simply be inverted and registered in the register. This would allow two fast clock cycles of output delay.

As with embodiments in accordance with the first aspect of the present invention, for embodiments in accordance with the second aspect of the present invention, the count value of the counter circuitry can be re-initialised in dependence on an indication signal providing a timing indication of a sampling edge in the slow clock domain. Further, the specified output delay value can be fixed or programmable, and if error determination circuitry is provided for detecting a mis-sampling of the signal by the storage element of the interface circuitry, then an error signal generated in those conditions can be used to vary the specified output delay value. Further, the specified output delay value may be specified as an integer number of second clock periods, or alternatively may be specified as a non-integer value. Further, the enable circuitry may be provided externally to the interface circuitry, for example to enable the same enable circuitry to provide enable signals to multiple interface circuits, or alternatively the enable circuitry may be provided within the interface circuitry.

Viewed from a third aspect, the present invention provides a method of translating a signal between a first clock domain having a first clock period and a second clock domain having a second clock period, the second clock period being synchronous with but slower than the first clock period, the signal being generated by a first component operating in the first clock domain and being received by a second component operating in the second clock domain, the method comprising the steps of: temporarily buffering in a storage element operating in the first clock domain the signal generated by the first component before outputting that signal to the second component; and controlling output of the signal from the storage element having regard to a specified input delay value identifying an input delay time of the second component expressed in terms of the first clock period.

Viewed from a fourth aspect, the present invention provides a method of translating a signal between a first clock domain having a first clock period and a second clock domain having a second clock period, the second clock period being synchronous with but faster than the first clock period, the signal being generated by a first component operating in the first clock domain and being received by a second component operating in the second clock domain, the method comprising the steps of: temporarily buffering in a storage element operating in the second clock domain the signal generated by the first component before outputting that signal to the second component; and controlling input of the signal into the storage element having regard to a specified output delay value identifying an output delay time associated with the output of the signal from the first component expressed in terms of the second clock period.

In some embodiments, the same enable circuitry can be used to generate enable signals for both interface circuits handling translations of signals from a fast clock domain to a slow clock domain and interface circuits handling the translation of signals from the slow domain to the fast clock domain, and in one such embodiment the enable signal provided to an interface circuit translating a signal from the fast clock domain to the slow clock domain may be the inverse of the enable signal provided to an interface circuit handling the transition of a signal from the slow clock domain to the fast clock domain.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 3:
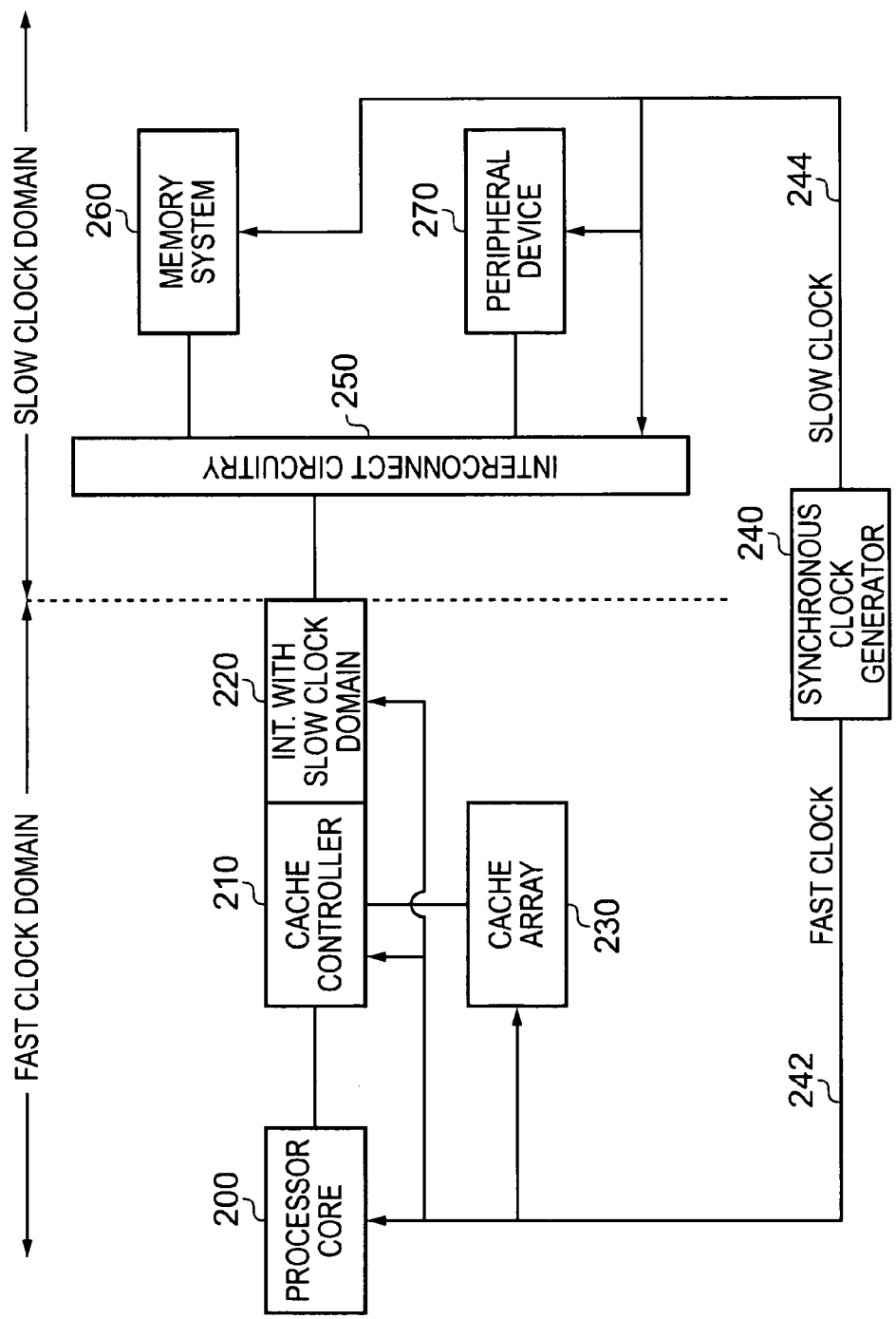
FIG. 3 is a block diagram of a data processing apparatus in accordance with one embodiment of the present invention.

FIG. 3 is a block diagram illustrating one particular embodiment of the present invention where it is necessary to transfer signals between a fast clock domain and a slow clock domain. In accordance with the embodiment illustrated in FIG. 3, a processor core 200 has a cache associated therewith consisting of a cache controller 210 and a cache array 230. The processor core 200, cache controller 210 and cache array 230 may be provided within a central processing unit (CPU), which may itself form part of a SoC. A synchronous clock generator 240 is provided for the SoC, and is arranged to generate a fast clock signal for the CPU and a slow clock signal for other components of the SoC. In particular, as shown in FIG. 3, the synchronous clock generator 240 generates a fast clock which it issues over path 242 to the processor core 200, cache controller 210, cache array 230, and interface circuitry 220 associated with the cache controller 210 and providing an interface with the slow clock domain.

In the slow clock domain, a number of components may be provided, and in the illustrated example, the CPU connects via interconnect circuitry 250 with a memory system 260 and one or more peripheral devices 270. Whilst the CPU requires high performance, and is hence clocked by the fast clock signal, other components of the SoC do not require such high performance, or are incapable of operating at the higher clock frequency associated with the fast clock, and accordingly are instead driven by a slower clock signal routed over path 244. For components which are not required to operate at the high frequency associated with the CPU, it is more efficient to run those components from the slow clock signal, as this reduces power consumption. However, the presence of multiple components running at different clock frequencies gives rise to an issue of handling the transfer of signals between those components.

In particular, as shown in FIG. 3, two distinct clock domains are provided, and interface circuitry 220 needs to be provided for handling the transfer of signals from the fast clock domain to the slow clock domain, and similarly from the slow clock domain to the fast clock domain. This interface circuitry has to be provided in association with every signal routed from one clock domain to the other and that interface circuitry needs to ensure that the signal is sampled in the receiving clock domain at an appropriate time to avoid any metastability in the signal received by a storage element in that receiving clock domain. In particular, to avoid metastability, the signal needs to be stable at the time it is sampled.

In the example illustrated in FIG. 3, when the processor core 200 requires a data value (whether that be an instruction or data to be manipulated by the processor core when executing such instructions), it will issue an access request specifying the address in memory associated with the required data value, and that access request will be received by the cache controller 210. If the specified address is in a cacheable region of memory, the cache controller 210 will determine with reference to the cache array 230 whether the data value the subject of the access request is in the cache array, and if so the access can proceed with reference to the data value as held in the cache array. However, if the data value is not in the cache array, or if the specified address is not in a cacheable region of memory, then the access request is instead output from the cache controller 210 via the interface circuitry 220 to the interconnect circuitry 250 for routing to the memory system 260 from where the data value can be accessed. Some peripheral devices 270 are also address mapped so that certain internal storage within those peripheral devices can be accessed by such access requests, and accordingly for certain addresses specified in an access request, the peripheral device 270 may service that access request.

For each access request, there will be a number of control signals, a multi-bit address signal passing from the fast clock domain to the slow clock domain and one or more multi-bit data signals passing either from the fast clock domain to the slow clock domain (for a write access) or from the slow clock domain to the fast clock domain (for a read access). Considering the control signals, some of these may be routed from the fast domain to the slow clock domain, whilst other control signals may be routed from the slow clock domain to the fast clock domain. These signals may specify certain information about the access request, such as whether it is a write access request, a read access request, is cacheable, bufferable, etc. In addition, the control signals are likely to include handshake signals passed between the processor core 200 and the device servicing the access request, whether that be the memory system 260 or the peripheral device 270. In one particular embodiment, a valid-ready handshake mechanism is used. In accordance with such a handshake mechanism, the recipient for a transfer of payload data (e.g. an address, write data, or read data) asserts a ready signal whenever it is available to receive the payload data, and the initiator of the transfer issues a valid signal whenever it asserts valid payload data. The valid signal is typically sticky, such that once it has been asserted, it will not be de-asserted until the payload data has been transferred. In contrast, the ready signal is typically not sticky, and accordingly the recipient device can assert and de-assert the ready signal as and when it considers appropriate. The payload data is sampled by a recipient register element on the sampling edge of the relevant clock signal, at a time when both the valid and ready signals are asserted.

Whilst as discussed above there are hence many signals which need to be transferred between the fast clock domain and the slow clock domain in either direction, for the purposes of the following discussions, the valid signal will be used as an example of a signal that needs to be transferred between the fast and slow clock domains, and it will be assumed for the purposes of illustration that the ready signal is always asserted.

Further, it will be appreciated that FIG. 3 illustrates a simple example embodiment, but in other embodiments there is likely to be additional interface circuitry provided, and indeed there may be more than two different clock domains between which signals must be transferred.

Figure 4:
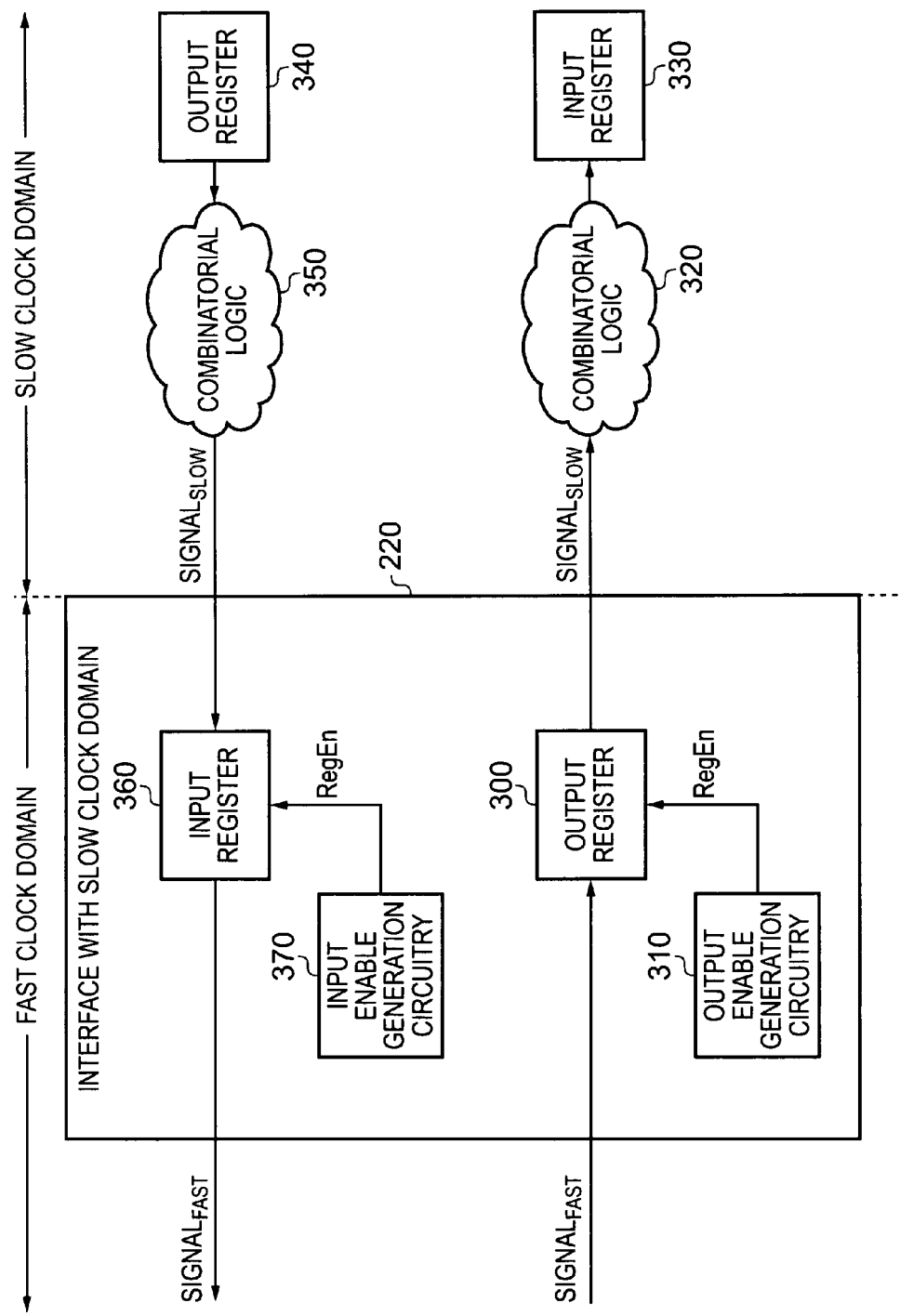
FIG. 4 is a block diagram illustrating in more detail the circuit elements placed within the interface 220 of FIG. 3 in accordance with one embodiment of the present invention.

FIG. 4 is a block diagram illustrating in more detail the interface circuitry 220 of FIG. 3 in accordance with one embodiment. The bottom part of FIG. 4 shows the transfer of a signal (e.g. a valid signal) from the fast clock domain to the slow clock domain, and an output register 300 is provided within the interface 220 for temporarily buffering that signal before outputting it to the slow clock domain. Output enable generation circuitry 310 is provided in association with the output register for issuing a register enable signal to the output register 300, which when set enables the output register to sample its input, and accordingly vary its output. The operation of the output enable generation circuitry 310 will be discussed in more detail later, but generally speaking the output enable generation circuitry 310 takes account of a clock ratio value specifying the ratio between the fast clock domain and the slow clock domain, and an input delay value identifying an input delay time associated with the input register 330 in the slow clock domain in order to determine when to set the register enable signal. The input delay time associated with the input register 330 results from propagation delays over the path in the slow clock domain, combinatorial delays associated with the combinatorial logic 320 that may be provided along that path, and set up delays associated with the input register 330 itself.

The upper half of FIG. 4 shows a path for a signal (e.g. a valid signal) output from the slow clock domain to the fast clock domain, the signal being output from an output register 340 via combinatorial logic 350 to an input register 360 within the interface 220. The input register 360 has input enable generation circuitry 370 associated therewith which determines when to issue a register enable signal to the input register 360, when the register enable signal is set the input register 360 being able to sample its input and accordingly vary its output. The operation of the input enable generation circuitry 370 will be discussed in more detail later, but generally speaking it takes account of an output delay value identifying an output delay time associated with the output of the signal from the output register 340 in the slow clock domain in order to determine when to set the register enable signal. The output delay time associated with the output register 340 results from propagation delays over the path in the slow clock domain and combinatorial delays associated with the combinatorial logic 350 that may be provided along that path. During the output delay time, the output from the output register 340 cannot be guaranteed to be stable, and accordingly should not be sampled by the input register 360. By use of the register enable signal output from the input enable generation circuitry 370, it is ensured that the signal is not in fact sampled at a time when it is still unstable.

In accordance with embodiments of the present invention, both the input delay time of the input register 330 and the output delay time of the output register 340 can be configured in terms of the fast clock period in the fast clock domain, thereby enabling the latency to be tuned having regard to the slow clock domain input or output delay constraints.

Figure 5:
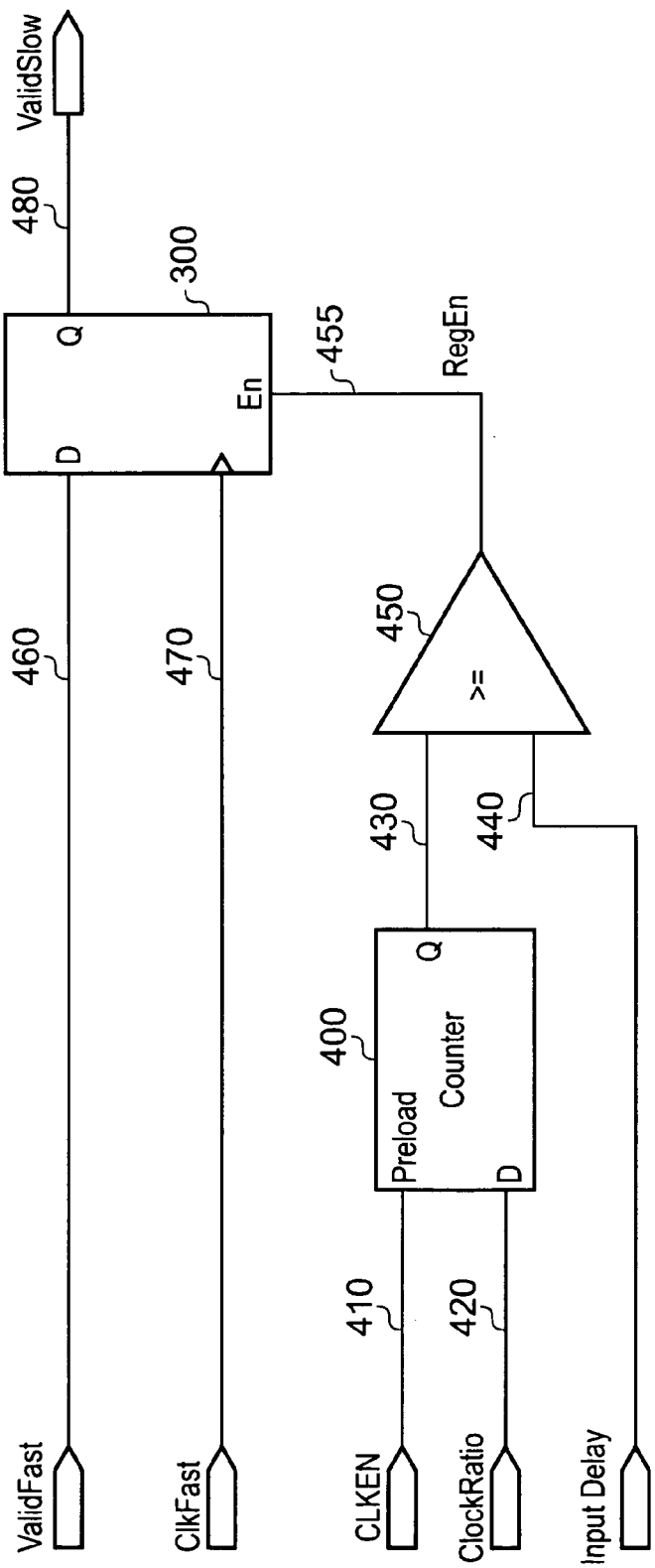
FIG. 5 is a block diagram illustrating in more detail the output enable generation circuitry 310 and output register 300 of FIG. 4 in accordance with one embodiment of the present invention.

FIG. 5 is a block diagram illustrating in more detail the output enable generation circuitry 310 of FIG. 4 in accordance with one embodiment. In particular, the output enable generation circuitry 310 comprises a counter 400 connected to a comparator 450. The counter 400 receives over path 420 a clock ratio value identifying the number of fast clock periods in each slow clock period. This clock ratio value will typically be an integer value, but in alternative embodiments could be a non-integer value. The counter 400 also receives over path 410 a clock enable signal generated in the fast clock domain and providing a timing indication about the sampling edge in the slow clock domain, so that in the fast clock domain it can be determined when an occurrence of the sampling edge of the fast clock is coincident with the sampling edge of the slow clock. Whenever the clock enable signal is asserted over path 410, the counter is reset to an initial value, which in the embodiment illustrated in FIG. 5 is the clock ratio value provided over path 420. Following a reset of the counter, the output from the counter over path 430 is decremented following each sampling edge of the fast clock, and the comparator 450 determines whether the output from the counter is greater than or equal to an input delay value provided over path 440. As discussed earlier, this input delay value is indicative of an input delay time of the input register 330 in the slow clock domain, but is specified as a number of fast clock periods.

In accordance with the embodiment of FIG. 5, whilst the comparator 450 determines that the output from the counter is greater than or equal to the input delay value, then the register enable signal is asserted over path 455, enabling the output register 300 of the interface 220 to sample the input received over path 460 on the sampling edge of the fast clock, the fast clock being received over path 470. This causes the sampled signal to be output over path 480 into the slow clock domain. However, as soon as the value from the counter is less than the input delay time, then the register enable signal is de-asserted which prevents the register 300 from sampling its input, and accordingly prevents the register from altering its output. This hence ensures that during the input delay time associated with the input register 330, the output from the register 300 is not changed, hence providing that input register 330 with a stable input.

Hence, considering the example of FIG. 5 which shows the valid signal being passed from the fast clock domain to the slow clock domain, then on the sampling edge of the fast clock at a time when both the valid signal is asserted and the register enable signal is asserted, this will cause the asserted valid signal to be output over path 480 into the slow clock domain. When subsequently the valid signal is de-asserted in the fast clock domain, this will cause the valid signal to be de-asserted in the slow clock domain when the register enable signal allows the output from register 300 to change. In one embodiment, when the clock enable signal is asserted and the valid slow signal is asserted, this condition is used to reset the valid signal in the fast clock domain, which also causes the valid slow signal to be reset assuming the register enable signal is set. However, it will be appreciated that the valid signal need not always be reset under such conditions. For example, if the initiator still has payload data to send it may retain the valid signal asserted for longer.

Whilst in the example of FIG. 5, the register enable signal is set whenever the output from the counter is greater than or equal to the input delay value, in an alternative embodiment, the comparator may be arranged to only set the register enable signal when its two inputs are equal, so that the register enable signal is only set for a single fast clock period, and becomes in effect a shifted version of the clock enable signal. In particular, the register enable signal would then be set during a fast clock period at the end of a window of time in which the output register 300 can sample its input and hence vary its output.

Figure 6:
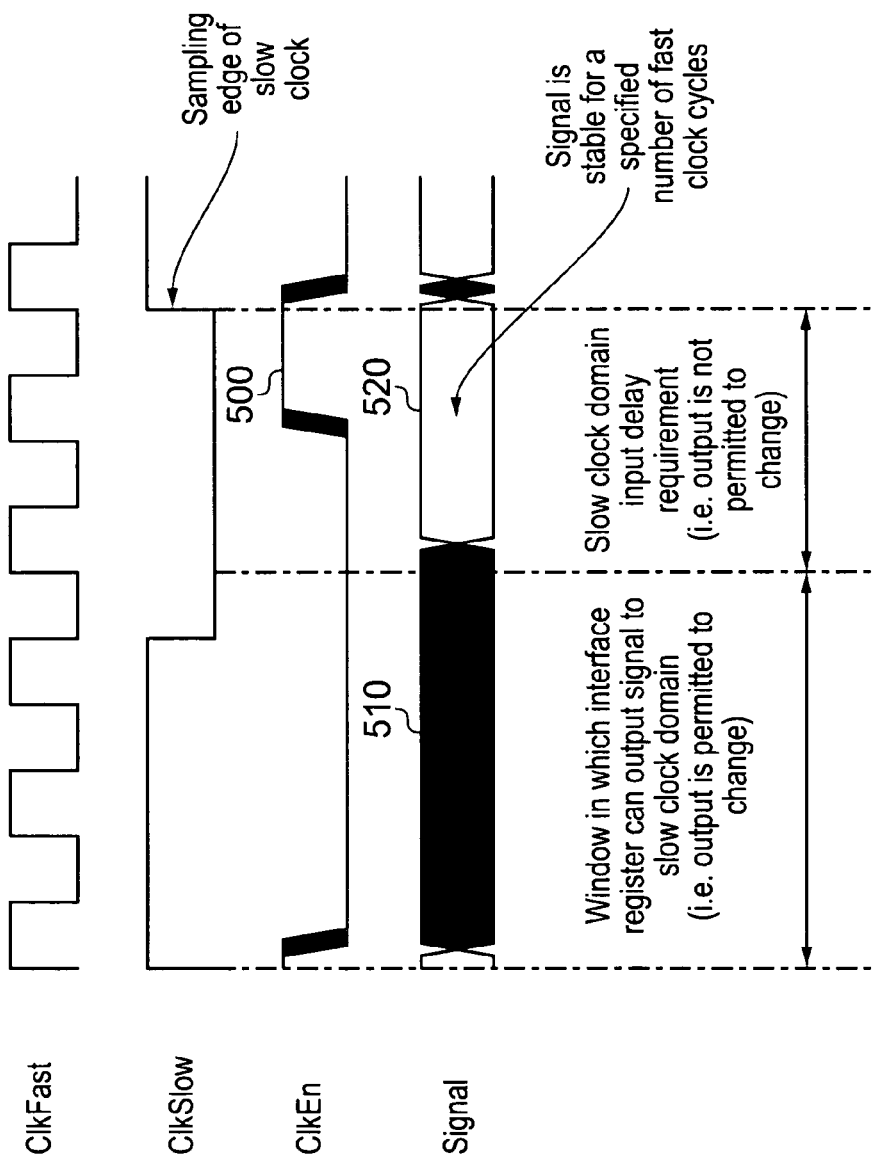
FIG. 6 is a timing diagram schematically illustrating the input delay requirements of the slow clock domain.

This window of time is illustrated schematically in FIG. 6 which illustrates a single period of the slow clock signal. As can be seen, in this example the clock ratio is 5:1, in that the fast clock is five times the frequency of the slow clock. The clock enable signal 500 is asserted during the fast clock period prior to the sampling edge of the fast clock which is coincident with the sampling edge of the slow clock. During period 510, the signal to be transferred from the fast clock domain to the slow clock domain can be varied, and accordingly the output register 300 can be enabled to sample its input, and accordingly vary its output. However, during the period 520, it is important that the output from the register 300 is not varied, since this time corresponds to the slow clock domain input delay requirements. In this example, it can be seen that the input delay requirements in the slow clock domain equate to two fast clock periods and by use of the register enable signal, it can be ensured that the register 300 does not vary its output during the period 520, hence providing a stable output for sampling by the input register 330 of FIG. 4.

Figure 7:
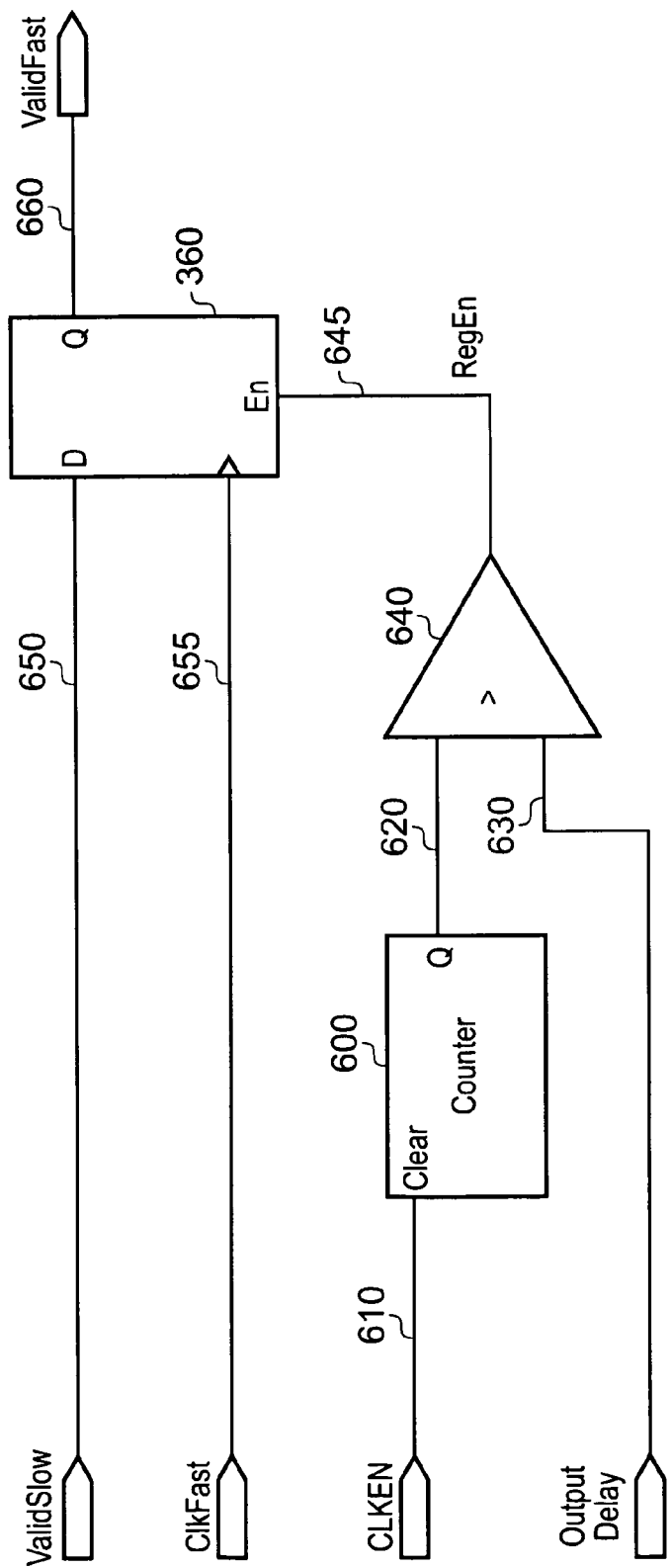
FIG. 7 is a block diagram illustrating in more detail the input enable generation circuitry 370 and input register 360 of FIG. 4 in accordance with one embodiment of the present invention.

FIG. 7 illustrates in more detail the input enable generation circuitry 370 of FIG. 4 in accordance with one embodiment. In particular, the input enable generation circuitry 370 consists of a counter 600 and a comparator 640. The counter 600 receives the clock enable signal over path 610, and whenever the clock enable signal is asserted, the counter is cleared. Thereafter, on each sampling edge of the fast clock, the counter value output over path 620 is incremented, and the comparator 640 determines whether the output from the counter is greater than the output delay value passed over path 630 to the comparator. As discussed earlier, this output delay value identifies the output delay associated with the output register 340 in the slow clock domain in terms of a number of fast clock periods. Hence, until the counter exceeds the output delay value, the register enable signal is not asserted, but as soon as the counter value does exceed the output delay value, the register enable signal is asserted, and accordingly the input register 360 can then on the following sampling edge of the fast clock signal received over path 655 sample the valid signal received from the slow clock domain over path 650, which thereafter enables the valid signal to be output over path 660 into the fast clock domain.

Whilst in the example of FIG. 7, the register enable signal is set whenever the output from the counter is greater than the output delay value, in an alternative embodiment, the comparator may be arranged to only set the register enable signal for one fast clock period when the output from the counter is first greater than output delay value, so that the register enable signal becomes in effect a shifted version of the clock enable signal. In particular, the register enable signal would then be set during a fast clock period at the start of a window of time in which the input register 360 can sample its input.

Figure 8:
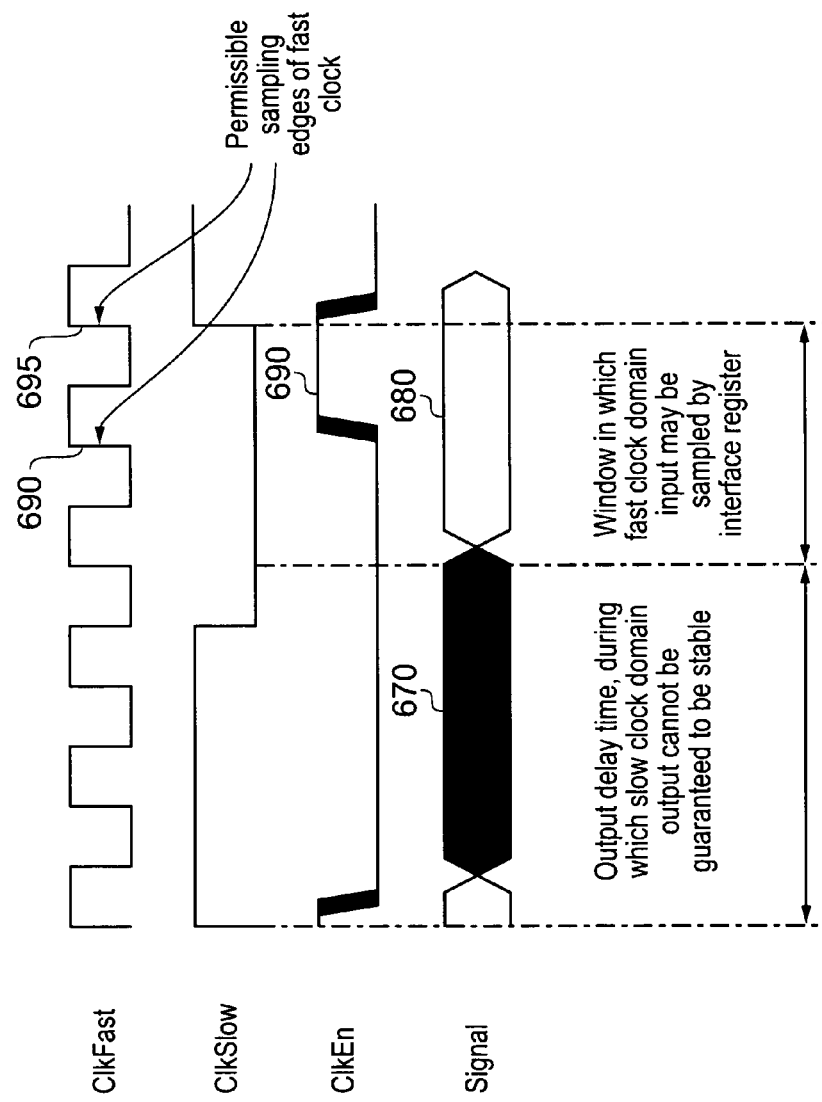
FIG. 8 is a timing diagram schematically illustrating the output delay time requirements of the slow clock domain.

FIG. 8 is a timing diagram illustrating a single slow clock period and identifying the output delay time. In this example, as with the example of FIG. 6, the clock ratio is 5:1, and the clock enable signal is asserted in the final fast clock period before the sampling edge of the fast clock period which is coincident with the sampling edge of the slow clock period. In this example, the output delay time 670 during which the slow clock domain output from the output register 340 cannot be guaranteed to be stable equates to three fast clock periods, and accordingly it is only following those three fast clock periods (in period 680) that the register enable signal is asserted to enable the register 360 to sample the valid signal received at this input from the slow clock domain. Accordingly, as shown in FIG. 8, there are two permissible sampling edges 690, 695 of the fast clock during which the register 360 will be enabled.

Figure 9:
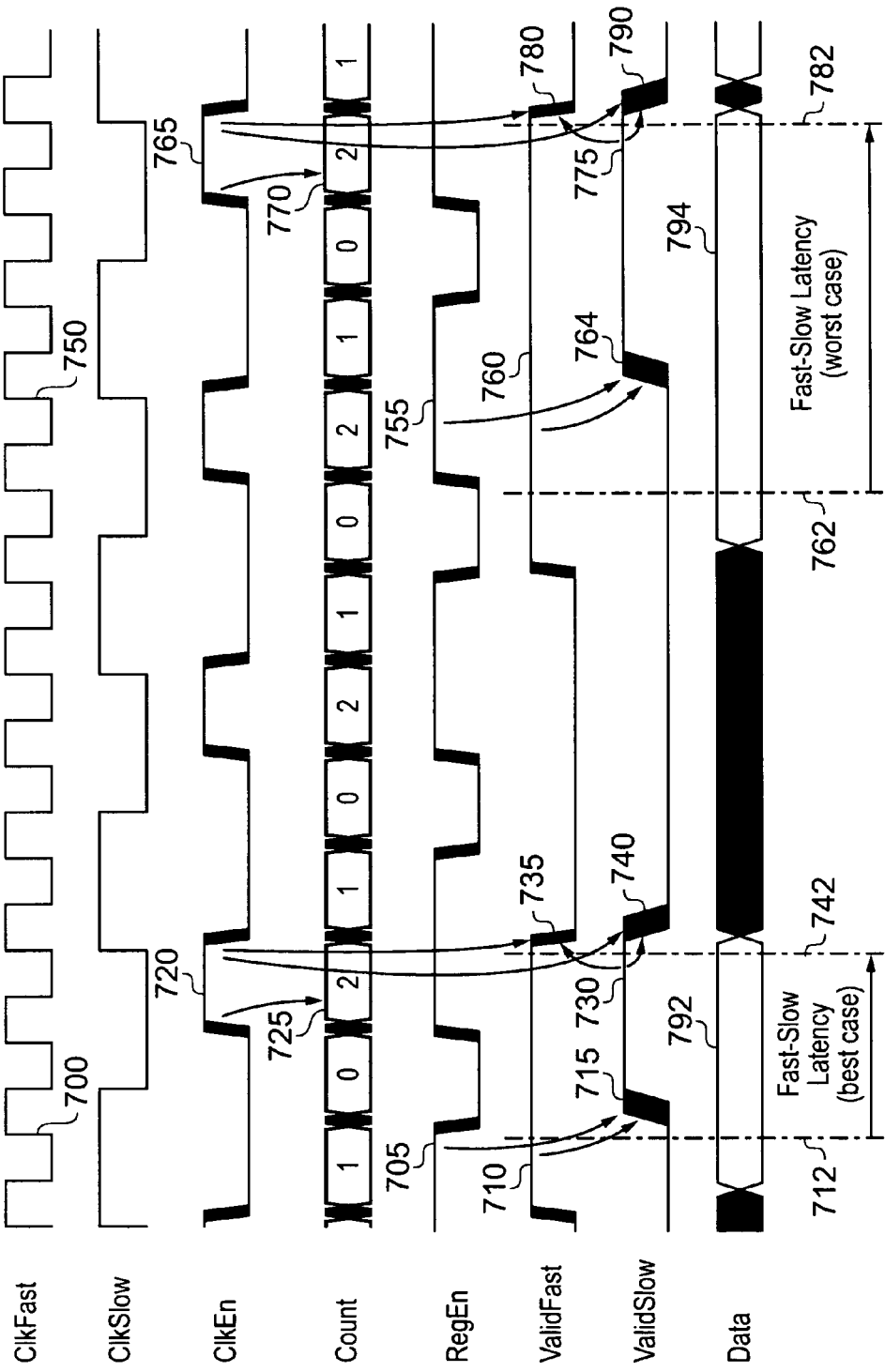
FIGS. 9 and 10 are timing diagrams illustrating the transfer of a valid signal from a fast clock domain to a slow clock domain in accordance with embodiments of the present invention, for two different clock ratios.

FIG. 9 is a timing diagram illustrating the operation of the circuitry of FIG. 5 used to transfer a valid signal from the fast clock domain to the slow clock domain. In this embodiment, it can be seen that the clock ratio is 3:1, and accordingly the counter starts at a value of 2, and is decremented to 1 and then 0. Similarly, in this example, it is assumed that the input delay value identifies that the input delay in the slow clock domain equates with two fast clock cycles, and accordingly the input delay value received over path 440 by the comparator 450 has a value of 1. Hence, in this embodiment, whilst the counter value is either 2 or 1, the register enable signal is set, and is then de-asserted when the counter falls to the value 0. Hence, the last fast clock period in which the register enable signal is asserted identifies the end of the window of time available for the register 300 to sample its input, and accordingly vary its output prior to the start of two further fast clock periods before the sampling edge of the slow clock.

Considering FIG. 9 in more detail, at the sampling edge 700 of the fast clock signal, the presence of the asserted register enable signal 705 and asserted valid fast signal 710 enables the register 300 to sample the valid fast signal which causes the valid slow signal to be asserted at point 715. When the clock enable signal is next asserted at point 720, this causes the counter to be reset at point 725, and on the next sampling edge of the fast clock, the presence of the asserted clock enable signal in combination with the asserted valid slow signal at point 730 causes the valid fast signal 735 to be de-asserted which in turn causes the valid slow signal to be de-asserted at point 740 (in this scenario it is assumed that there is no more data to transfer, since if there was more data to transfer then in one embodiment the valid signals would continue to be asserted).

In the embodiment illustrated in FIG. 9, the data with which the valid signal is associated is asserted whilst the valid fast signal is asserted, and accordingly the data is asserted during the period indicated by the block 792 in FIG. 9, and accordingly the data will also be sampled in the slow clock domain at point 742. Since point 712 was the earliest that the asserted valid signal in the fast clock domain would have been sampled by another component in the fast clock domain, then it can be seen that the latency resulting from the fast to slow clock domain transition is indicated by the two fast clock periods spanning between the points 712 and 742, and this represents the best case latency for this embodiment.

The right hand side of FIG. 9 shows the worst case latency when employing the technique of embodiments of the present invention. In this example, on the sampling edge 750 following the assertion of the register enable signal, the presence of the asserted register enable signal at point 755 and the asserted valid signal at point 760 causes the register 300 to sample the valid fast signal and output an asserted valid slow signal at point 764. However, this has occurred just following a sampling edge of the slow clock signal, and accordingly an entire slow clock period has to elapse before this asserted valid slow signal will be sampled in the slow clock domain at point 782. When the clock enable signal is asserted at point 765, this will cause the count value 770 to be reset, and the presence of the asserted clock enable signal in combination with the asserted valid slow signal will cause the valid fast signal to be de-asserted, which in turn will cause the valid slow signal to be de-asserted at point 790. In this case, the earliest point at which the asserted valid fast signal would have been sampled in the fast clock domain is at point 762, and accordingly the period of time between points 762 and 782 identify the latency due to the fast to slow clock domain transition. Again, the data is asserted for the entirety of the time the valid fast signal is asserted, as indicated by the block 794.

Figure 10:
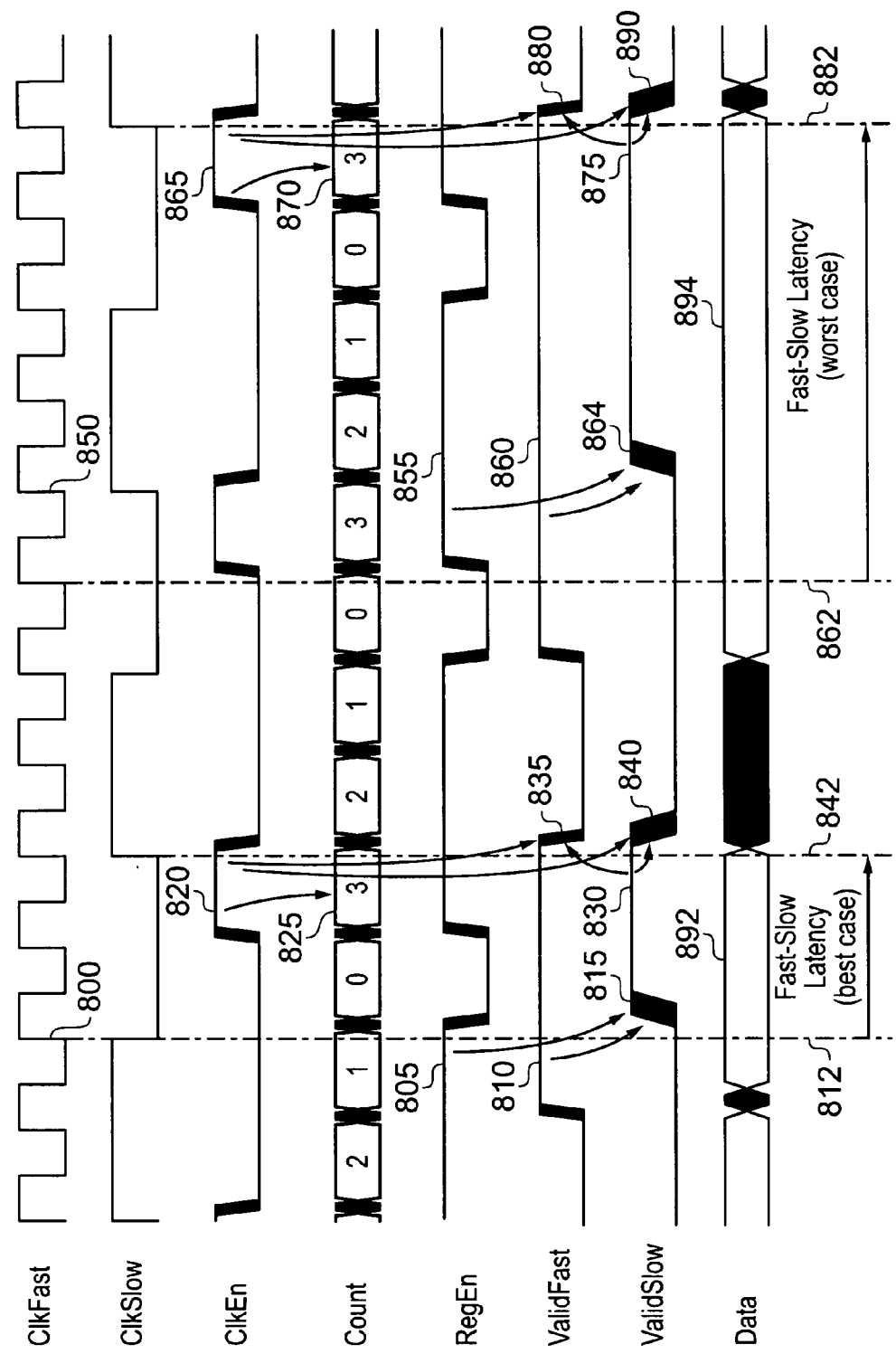

FIG. 10 is a similar timing diagram to that of FIG. 9, but shows the situation where the clock ratio is 4:1 rather than 3:1. The 800 series of reference numerals in FIG. 10 correspond with the 700 series reference of numerals used in FIG. 9, and again it is assumed that the input delay time is identified to be two fast clock periods. Accordingly, as with FIG. 9, the best case latency equates to two fast clock periods, but in this example the worst case latency equates to five fast clock periods rather than four fast clock periods, due to the increased clock ratio. In the general case, the worst case latency equates to one slow clock period plus one fast clock period.

Figure 11:
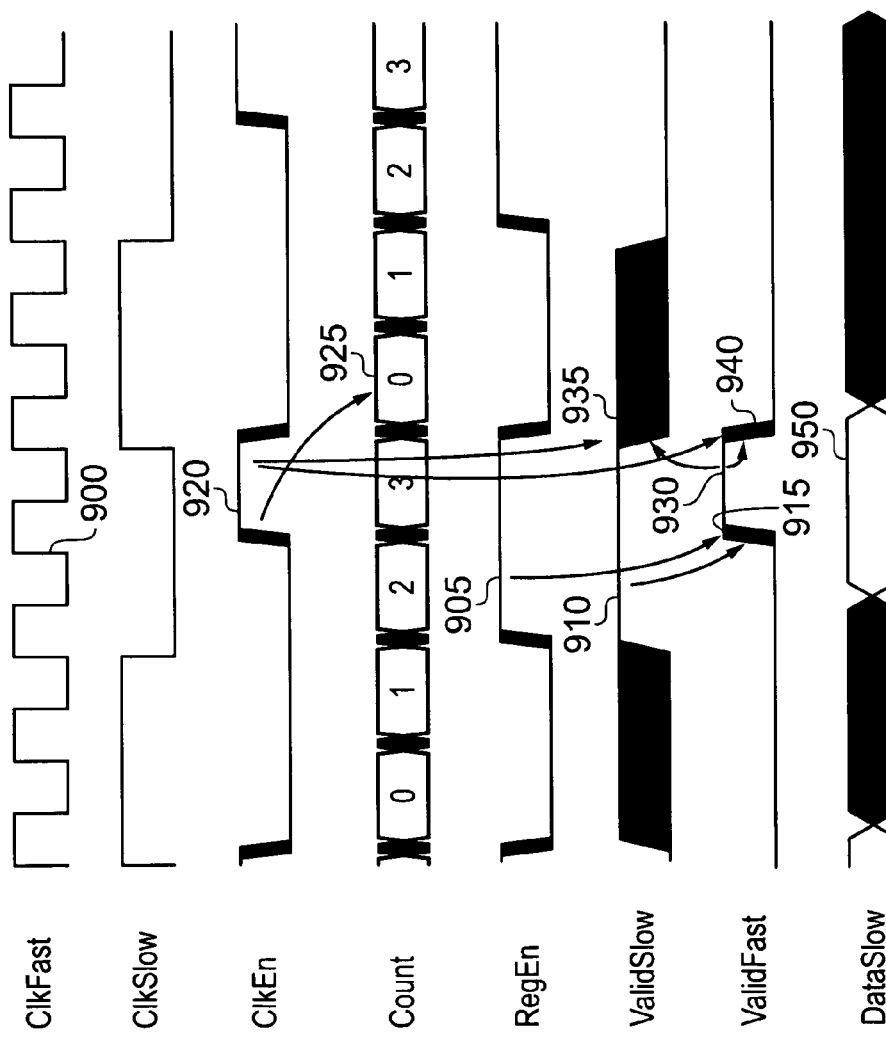
FIG. 11 is a timing diagram illustrating the transfer of a valid signal from a slow clock domain to a fast clock domain in accordance with one embodiment of the present invention.

FIG. 11 is a timing diagram showing how the circuitry of FIG. 7 is used to manage the transition of a valid signal from the slow clock domain to the fast clock domain. In this example, the clock ratio is assumed to be 4:1, and accordingly the count value starts at 0 and counts up to 3 before then being reset to 0. Further it is assumed that the output delay time equates to two fast clock periods, and hence has a value of one. At the sampling edge 900 of the fast clock signal, the presence of the asserted register enable signal at point 905 and the asserted valid slow signal at point 910 will allow the register 360 to sample its input and output an asserted valid fast signal at point 915. In this example, the clock enable signal is also asserted on the sampling edge 900, and accordingly on the next sampling edge of the fast clock period, the presence of the asserted clock enable signal and asserted valid fast signal is used to de-assert the valid slow signal at point 935, which in turn causes the valid fast signal to be de-asserted at point 940. As shown in FIG. 11, the data in the slow clock domain is asserted whilst the valid slow signal is asserted, and accordingly is asserted during the period 950 indicated in FIG. 11.

Comparing the slow-fast transition illustrated in FIG. 11 with the fast-slow transition illustrated in FIGS. 9 and 10, it should be noted that there is no best case and worst case scenario in FIG. 11. This is due to the fact that when transitioning from the slow clock domain to the fast clock domain the signal is always sampled at the earliest opportunity having regard to the output delay value (i.e. at the start of the window 680 illustrated in FIG. 8).

In addition, when comparing the slow-fast transition illustrated in FIG. 11 with the fast-slow transition illustrated in FIGS. 9 and 10, two different counter mechanisms are shown. In FIG. 11 a synchronous clear mechanism is assumed, whilst in FIGS. 9 and 10 an asynchronous preload mechanism is assumed. In effect, the count signal shown in FIGS. 9 and 10 shows the "next" value (like the D input to a register) of the registered version of the counter, whilst the count signal shown in FIG. 11 shows the registered version of the counter value (like the Q output of a register). It will be appreciated that either counter mechanism can be used for both the fast-slow transition and the slow-fast transition enable generation circuits.

Figure 12:
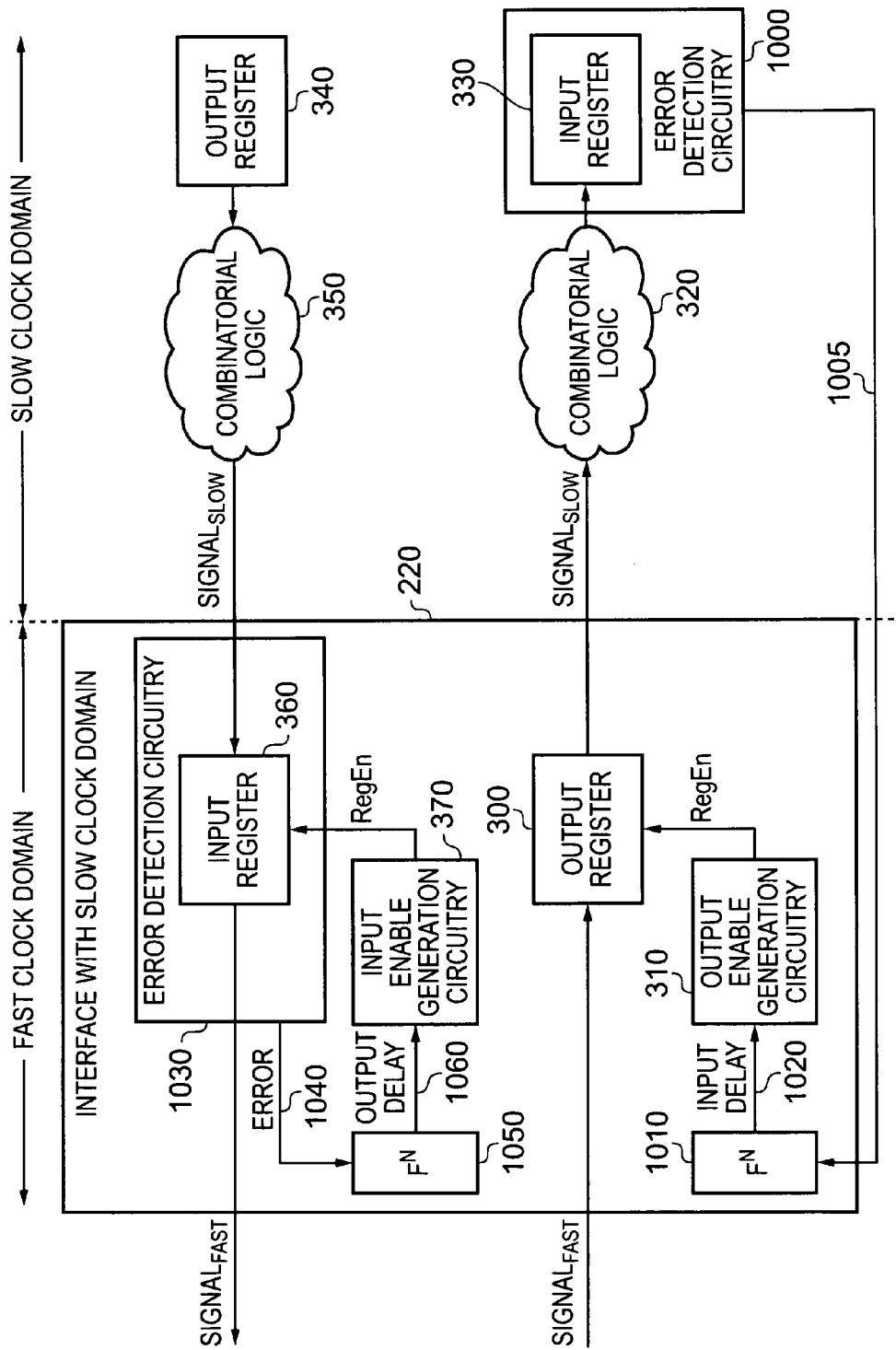
FIG. 12 illustrates an alternative embodiment of the circuitry of FIG. 4 which enables errors to be detected and changes to the input delay time or output delay time to be made dependent on the errors.

FIG. 12 illustrates an alternative for the circuitry of FIG. 4, where error detection circuitry is included in association with the receiving registers. In particular, error detection circuitry 1000 is provided in association with the input register 330 in the slow clock domain, and error detection circuitry 1030 is provided in association with the input register 360 in the interface 220 of the fast clock domain. As discussed earlier, one way to implement such error detection circuitry is to use the relevant input register to sample a signal, and then to sample the same signal a small time later and determine whether there is any difference between the two signals. Such a technique is described in co-pending US publication no. US 2004-0199821. If the values are different, this indicates an error, and the error detection circuitry may be provided with a mechanism for recovering from that error. In addition, in accordance with embodiments of the present invention, the error detection circuitry 1000, 1030 can in such situations output an error signal which can be used to vary one of the input parameters to the enable generation circuits. In particular, the error detection circuitry 1000 can output an error signal over path 1005 which is received by a function 1010 used to determine the appropriate input delay time to provide to the output enable generation circuitry over path 1020. Hence, such a feedback mechanism enables the input delay time to be increased in situations where errors are detected in the sampling of the signal by the input register 330.

Similarly, the error detection circuitry 1030 can issue an error signal over path 1040 to the function 1050 used to produce the output delay time routed over path 1060 to the input enable generation circuitry 370. Hence, in situations where an error is detected in the sampling by the input register 360, the output delay time can be increased, hence causing a greater delay before the register enable signal is set, and hence before the input register 360 samples the signal output by the output register 340.

The functions 1010, 1050 shown in FIG. 12 may be implemented in hardware, or may be software-based functions for determining the input delay time and output delay time, respectively.

In accordance with the above described techniques, it can be seen that such techniques allow the minimum input delay requirements or output delay requirements in the slow clock domain to be configured in terms of a number of fast clock cycles. The configuration can be specified by a value which is fixed, or programmable via for example a register. Further, as described with reference to FIG. 12, certain feedback mechanisms can be used to alter the configuration.

Figure 1:
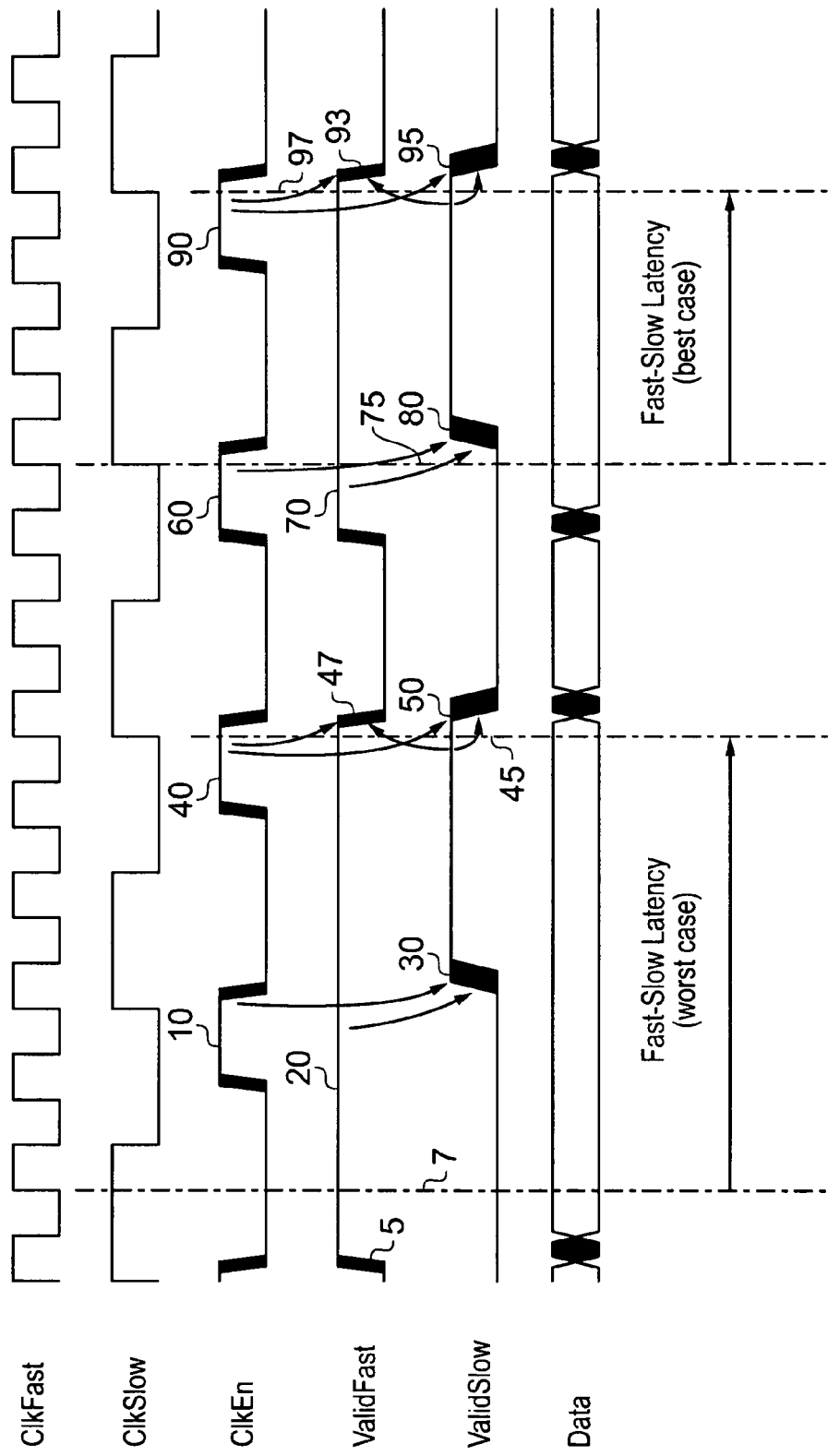
FIG. 1 is a timing diagram illustrating a known prior art technique for transferring a valid signal from a fast clock domain to a slow clock domain.
Figure 2:
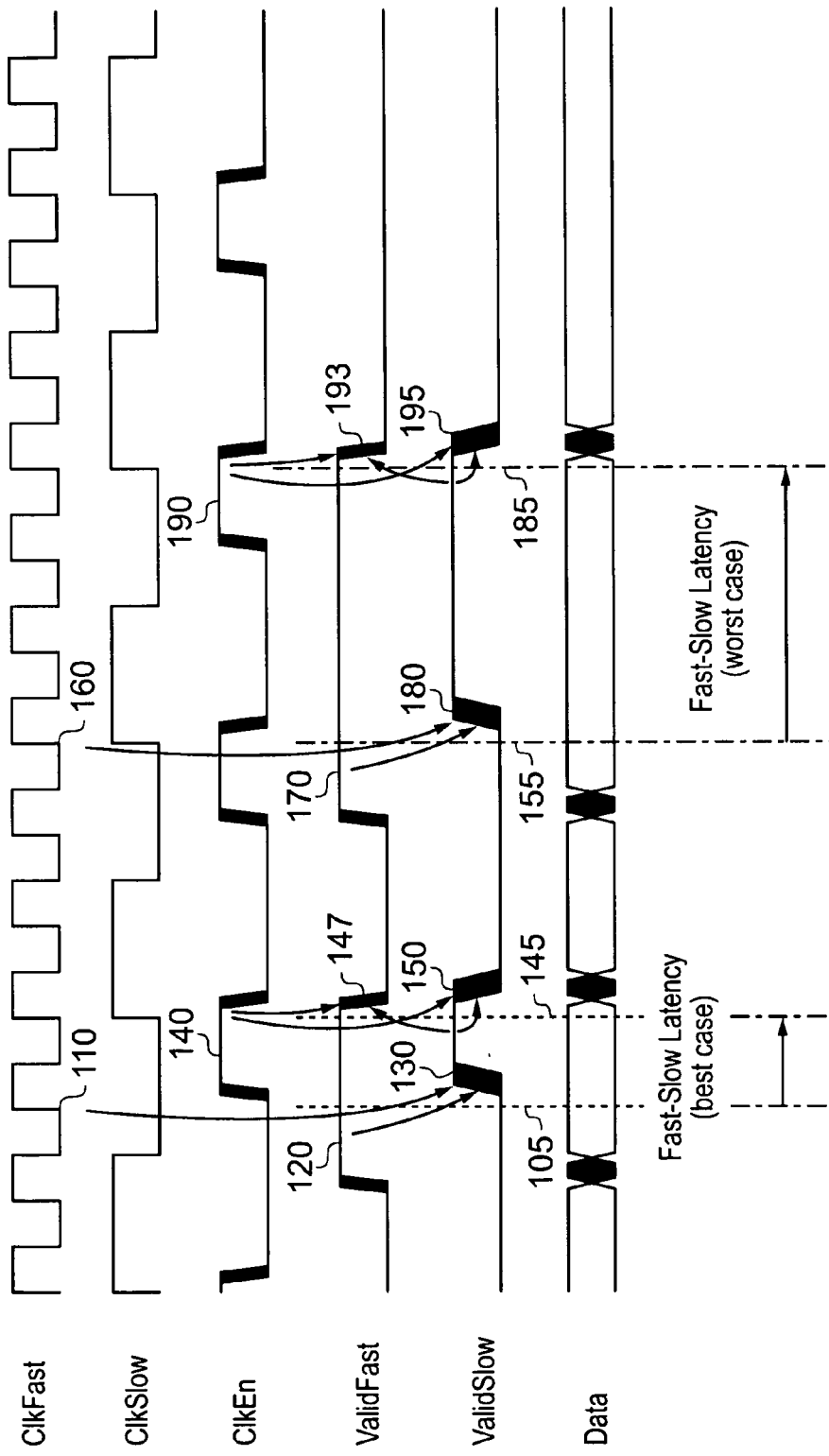
FIG. 2 is a timing diagram illustrating an alternative prior art technique for transferring a valid signal from a fast clock domain to a slow clock domain.

By employing the techniques of embodiments of the present invention, significant reductions in latency can be achieved when compared with the prior art technique discussed earlier with reference to FIG. 1, and further the problems associated with the prior art technique of FIG. 2 are addressed since the input and output delays in the slow clock domain do not need to be constrained against a fast clock period.

Whilst in the above described examples, the enable circuitry generates the register enable signal for a particular associated register, it will be appreciated that in alternative embodiments the same enable circuitry can be used to generate register enable signals for multiple sampling registers. Further, in some embodiments, it may be possible to use the same enable circuitry to generate both the register enable signals for the registers handling signals passing from the fast to the slow clock domain and for registers handling signals passing from the slow to the fast clock domain, since it may be possible to arrange for one register enable signal to be the inverse of the other.

Further, in some embodiments, the size of the counter logic can be reduced. For example, considering the example of FIG. 5, if the comparator 450 were arranged to only generate a register enable signal when the output from the counter was equal to the input delay time, then this would reduce the required size of the counter from the clock ratio value to the input delay time.

Further, whilst FIGS. 5 and 7 show two particular example implementations of the output enable generation circuitry and input enable generation circuitry, respectively, it will be appreciated that alternative circuits could be constructed, for example circuits that use combinations of the ClkEn signal, the ClkSlow signal (if made available to the circuit) and registers could be provided as optimisations for specific cases of clock ratio and input/output delays.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
    a first component for generating a signal, the first component operating in a first clock domain having a first clock period;
    a second component for receiving the signal, the second component operating in a second clock domain having a second clock period, the second clock period being synchronous with but slower than the first clock period;
    interface circuitry for translating the signal between the first clock domain and the second clock domain, the interface circuitry operating in the first clock domain and comprising a storage element for temporarily buffering the signal generated by the first component before outputting that signal to the second component; and
    enable circuitry configured to initiate output of the signal from the storage element in dependence upon a specified input delay value identifying an input delay time of the second component expressed in terms of the first clock period.

2. A data processing apparatus as claimed in claim 1, wherein the enable circuitry is arranged to issue an enable signal to the storage element, the enable signal being set to identify a window of time during which the storage element is enabled to output the signal to the second component, the enable circuitry being responsive to the specified input delay value and a clock ratio value specifying a ratio between the first clock period and the second clock period to determine when to set said enable signal.

3. A data processing apparatus as claimed in claim 2, wherein said enable circuitry comprises counter circuitry which is responsive to each iteration of the first clock period to modify a count value, the count value being initialised to an initial value selected in dependence on at least the clock ratio value, and the enable signal being set until the count value reaches a predetermined value.

4. A data processing apparatus as claimed in claim 3, wherein the initial value of the count value is derived from the clock ratio value, and the count value is decremented on each iteration of the first clock period, the enable circuitry further comprising:
    comparator circuitry for comparing the count value with the specified input delay value and for setting said enable signal until the count value reaches said predetermined value, said predetermined value being derived from the specified input delay value.

5. A data processing apparatus as claimed in claim 3, wherein the counter circuitry is arranged to receive an indication signal providing a timing indication of a sampling edge in the second clock domain, the count value being re-initialised to said initial value in dependence on the indication signal.

6. A data processing apparatus as claimed in claim 5, wherein the enable circuitry is arranged to determine the clock ratio value by counting the number of first clock periods between consecutive timing indications provided by said indication signal.

7. A data processing apparatus as claimed in claim 1, wherein the specified input delay value is programmable.

8. A data processing apparatus as claimed in claim 1, further comprising error determination circuitry for detecting a mis-sampling of the signal by the second component and generating an error signal upon such detection, the specified input delay value being chosen in dependence on said error signal.

9. A data processing apparatus as claimed in claim 1, wherein the specified input delay value is an integer number of first clock periods.

10. A data processing apparatus as claimed in claim 1, wherein the enable circuitry is provided within the interface circuitry.

11. A data processing apparatus comprising:
    a first component for generating a signal, the first component operating in a first clock domain having a first clock period;
    a second component for receiving the signal, the second component operating in a second clock domain having a second clock period, the second clock period being synchronous with but faster than the first clock period;
    interface circuitry for translating the signal between the first clock domain and the second clock domain, the interface circuitry operating in the second clock domain and comprising a storage element for temporarily buffering the signal generated by the first component before outputting that signal to the second component; and
    enable circuitry configured to initiate output of the signal into the storage element in dependence upon a specified output delay value identifying an output delay time associated with the output of the signal from the first component expressed in terms of the second clock period.

12. A data processing apparatus as claimed in claim 11, wherein the enable circuitry is arranged to issue an enable signal to the storage element, the enable signal being set to identify a window of time during which the storage element is enabled to receive the signal from the first component, the enable circuitry being responsive to the specified output delay value to determine when to set said enable signal.

13. A data processing apparatus as claimed in claim 12, wherein said enable circuitry comprises counter circuitry which is responsive to each iteration of the second clock period to modify a count value, the count value being initialised to an initial value, and the enable signal being set when the count value reaches a predetermined value.

14. A data processing apparatus as claimed in claim 13, wherein the initial value of the count value is zero, and the count value is incremented on each iteration of the second clock period, the enable circuitry further comprising:

comparator circuitry for comparing the count value with the specified output delay value and for setting said enable signal when the count value reaches said predetermined value, said predetermined value being derived from the specified output delay value.

15. A data processing apparatus as claimed in claim 13, wherein the counter circuitry is arranged to receive an indication signal providing a timing indication of a sampling edge in the first clock domain, the count value being re-initialised to said initial value in dependence on the indication signal.

16. A data processing apparatus as claimed in Claim 11, wherein the specified output delay value is programmable.

17. A data processing apparatus as claimed in claim 11, further comprising error determination circuitry for detecting a mis-sampling of the signal by the storage element of the interface circuitry, and for generating an error signal upon such detection, the specified output delay value being chosen in dependence on said error signal.

18. A data processing apparatus as claimed in claim 11, wherein the specified output delay value is an integer number of second clock periods.

19. A data processing apparatus as claimed in claim 11, wherein the enable circuitry is provided within the interface circuitry.

20. A method of translating a signal between a first clock domain having a first clock period and a second clock domain having a second clock period, the second clock period being synchronous with but slower than the first clock period, the signal being generated by a first component operating in the first clock domain and being received by a second component operating in the second clock domain, the method comprising the steps of:

temporarily buffering in a storage element operating in the first clock domain the signal generated by the first component before outputting that signal to the second component; and controlling output of the signal from the storage element in dependence upon a specified input delay value identifying an input delay time of the second component expressed in terms of the first clock period.

21. A method of translating a signal between a first clock domain having a first clock period and a second clock domain having a second clock period, the second clock period being synchronous with but faster than the first clock period, the signal being generated by a first component operating in the first clock domain and being received by a second component operating in the second clock domain, the method comprising the steps of:

temporarily buffering in a storage element operating in the second clock domain the signal generated by the first component before outputting that signal to the second component; and controlling input of the signal into the storage element in dependence upon a specified output delay value identifying an output delay time associated with the output of the signal from the first component expressed in terms of the second clock period.

* * * * *